United States Patent [19]
Kennedy et al.

[11] Patent Number: 6,107,216
[45] Date of Patent: Aug. 22, 2000

[54] BONDED STRUCTURE WITH HIGH-CONDUCTIVITY BONDING ELEMENT

[75] Inventors: Adam M. Kennedy, Santa Barbara; Timothy S. Romano, Santa Ynez; Larry E. Cobb, Goleta, all of Calif.

[73] Assignee: Raytheon Company, Lexington, Mass.

[21] Appl. No.: 08/989,288

[22] Filed: Dec. 12, 1997

[51] Int. Cl.[7] .................................................. B32B 15/08
[52] U.S. Cl. ........................ 442/19; 442/52; 428/312.8
[58] Field of Search ......................... 428/312.8; 442/19, 442/52

[56] References Cited

U.S. PATENT DOCUMENTS 3,839,080  10/1974  Jarema et al. ..................... 117/132 B
4,403,653   9/1983  Davidson .............................. 165/170

*Primary Examiner*—Christopher Raimund
*Attorney, Agent, or Firm*—William C. Schubert; Glenn H. Lenzen, Jr.

[57] ABSTRACT

A structure (20) is formed of a first article (22) such as a cold finger (82), a second article (24) such as an electronic component (78) to be affixed to and cooled by the cold finger (82), and a bonding element (26) disposed between and bonding together the first article (22) and the second article (24). The bonding element (26) includes a porous metallic body (28), such as a screen, a mesh, a felt, or a foam, and a mass of resin adhesive (36) impregnated into the metallic body (28). The mass of adhesive (36) contacts and bonds to the first article (22) and to the second article (24), and the porous metallic body (28) forms a substantially continuous, high-conductivity path between the first article (22) and the second article (24).

15 Claims, 2 Drawing Sheets

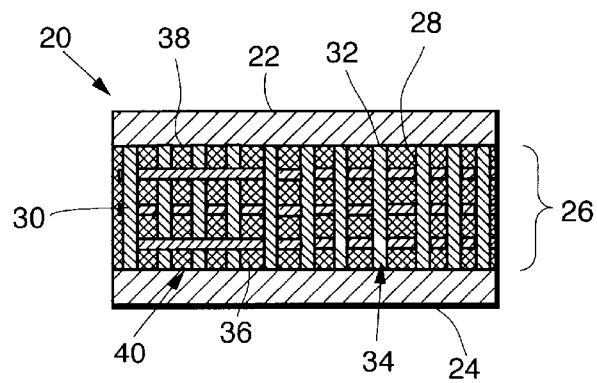
FIG. 1.
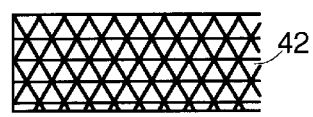
FIG. 2A
FIG. 2B
FIG. 2C
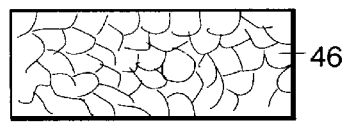
FIG. 3.
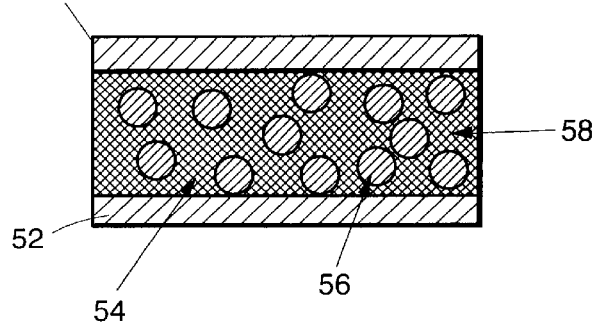

BONDED STRUCTURE WITH HIGH-CONDUCTIVITY BONDING ELEMENT

BACKGROUND OF THE INVENTION

This invention relates to the adhesive bonding of articles together, and, more particularly, to a bonded structure having high conductivity between the bonded articles.

Many infrared and other types of sensors operate most efficiently when cooled to a cryogenic temperature, such as about the boiling point of liquid nitrogen, 77 K. To effect this cooling in service, the sensor is mounted within a vacuum dewar. The dewar typically includes an insulated housing having a window through which the sensor views an external scene. The electronic component which includes the sensor is supported on one end of a thermally conductive support in a facing relation to the window.

When the sensor is to be operated, the opposite end of the support is cooled by contacting it with either a cold gas or a cryogenic liquid such as liquid nitrogen. Heat flows from the electronic component, through the support, and thence into the heat sink represented by the cold gas or cryogenic liquid. The electronic component, including the sensor, is cooled to the operating temperature of about that of the heat sink.

In this dewar structure, the electronic component must be mechanically affixed to the support with sufficient attachment strength that it can withstand accelerations and loads imposed during service, but in such a manner as to achieve good thermal conductivity from the electronic component to the support and thence to the heat sink. The conventional approach for bonding uses a filled adhesive such as a filled resin or a filled grease. The "filler" is particles of a thermally conductive material such as silver, which increase the effective thermal conductivity of the mixture of filler and adhesive to a value greater than that of the adhesive alone. For example, silver-filled epoxies having thermal conductivities greater than those of unfilled epoxies are available commercially and are used for this application.

The filled adhesive positioned between the electronic component and the support bonds the two together but also acts as a thermal barrier to the flow of heat from the electronic component to the heat sink. The greater the thermal barrier, the lower the rate at which the electronic component and its sensor may be cooled to the service operating temperature, a serious concern for many applications where the sensor must be rapidly cooled from room temperature to the operating temperature. Thus, there is a need for an affixing approach that has good mechanical bonding properties and has a greater thermal conductivity than available with the present approach. The present invention fulfills this need, and further provides related advantages.

SUMMARY OF THE INVENTION

The present invention provides a bonding element, a method of making the bonding element, and a structure in which the bonding element bonds articles together. The bonding element has a thermal conductivity much greater than that possible with available filled adhesives, while simultaneously exhibiting sufficient strength for bonding the articles together. The bonding element is readily and inexpensively prepared from available materials, and is readily stored and used. The bonding element may be used in applications requiring good electrical conductivity across the bond between two elements, as well as in those applications requiring good thermal conductivity. Although the preferred application of the inventors is in dewar structures, the bonding element has much broader applicability.

In accordance with the invention, a structure comprises a first article, a second article, and a bonding element disposed between and bonding together the first article and the second article. The bonding element comprises a porous metallic body, and a mass of resin adhesive impregnated into the metallic body such that the mass of adhesive further contacts and bonds to the first article and to the second article. The porous metallic body contacts the first article and the second article and forms a substantially continuous thermal and/or electrical path between the first article and the second article.

The porous metallic body is preferably in the form of a screen, a mesh, a felt, or a foam. It is preferably made of copper, aluminum, silver, or steel, or an alloy thereof, which have relatively high thermal and electrical conductivities. The adhesive is preferably an epoxy, although any other operable adhesive material may be used. The porous metallic body preferably occupies from about 5 to about 80 percent, preferably about 50 percent, by volume of the bonding element, with the remainder of the bonding element the resin adhesive. The higher the volume fraction of the metallic body in the bonding element, the higher the thermal and electrical conductivities of the bonding element and the lower the strength of the bond. The tradeoff between conductivity and strength determines the volume fraction of the metallic body selected for any application.

Further in accordance with the invention, a method of bonding together a first article and a second article comprises the steps of furnishing a first article, furnishing a second article; and preparing a bonding element preform. The step of preparing the bonding element preform includes the steps of furnishing a continuous, porous metallic body, and impregnating a mass of uncured resin adhesive into the metallic body. The bonding element is placed between and contacts the first article and the second article such that the porous metallic body contacts the first article and the second article and the mass of uncured resin adhesive contacts the first article and the second article. The uncured resin is thereafter cured according to its recommended procedure.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic side elevational view of a structure made according to the invention;

FIGS. 2A–C schematically illustrate various types of porous metallic bodies, including a mesh in FIG. 2A, a felt in FIG. 2B, and a foam in FIG. 2C;

FIG. 3 is a schematic side elevational view of a prior art structure;

DETAILED DESCRIPTION OF THE PREFERRED EMBODIMENTS

Figure 4:
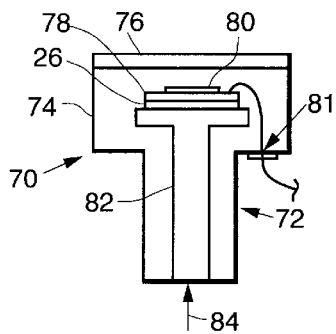
FIG. 4 is a side sectional view of a dewar using the approach of the invention.

FIG. 1 illustrates a structure 20 made according to the present invention. The structure 20 includes a first article 22, a second article 24, and a bonding element 26 that is disposed between and bonds together the first article 22 and the second article 24. The bonding element 26 includes two major components, a porous metallic body and a mass of adhesive.

There is a porous metallic body 28 which is, in this case, a wire screen 30 that on one end contacts the first article 22 at locations 32 and on the other end contacts the second article 24 at locations 34. The porosity between the wires of the screen 30 is impregnated with a mass of a resin adhesive 36 that on one side contacts the first article 22 at locations 38 and on the other side contacts the second article 24 at locations 40. That is, there is a substantially continuous conductive path between the first article 22 and the second article 24 through the porous metallic body 28, and a bonding path between the first article 22 and the second article 24 through the mass of resin adhesive 36. The term "substantially continuous" therefore applies to bonding elements having a fully continuous conductive path, such as the screen, and also includes bonding elements having a conductive path that has intermediate conductive structural elements and/or contacts, such as in the case of the felt discussed below. The porous body is a free standing element, not a mass of particles. A mass of distinct, individual particles (i.e., not sintered or otherwise joined particles) such as found in filled adhesives or greases is not a porous body with a substantially continuous conducting path.

The porous metallic body 28 is preferably made of a good or moderately good thermal and/or electrical conductor such as copper, aluminum, silver, or steel. (The terms copper, aluminum, and silver include the pure materials or their alloys, but pure materials are preferred as they have higher conductivities than their alloys.) The porous metallic body may be of any operable form, such as the wire screen 30 of FIG. 1. Other examples of operable forms of the porous metallic body include a mesh 42 (such as a honeycomb) illustrated in FIG. 2A, a pressed felt 44 of nonwoven metallic fibers illustrated in FIG. 2B, and an open-cell foam 46 illustrated in FIG. 2C. The felt 44 is formed of discontinuous fibers, but is operable because the numerous points of contact between the fibers result in a substantially continuous thermal or electrical path between the ends of the felt.

The porosity of the porous metallic body 28 is impregnated with the mass of resin adhesive 36. As will be discussed subsequently, the resin adhesive is initially uncured. As used herein, "uncured" means not fully cured, and includes both fully uncured resin and partially cured resin such as B-staged resin. During the processing, the resin adhesive is cured so that it bonds to the contacted surfaces 38 and 40, respectively, of the first article 22 and the second article 24. The resin adhesive is preferably a thermosetting adhesive such as an epoxy which is initially uncured and is cured by heating in a curing cycle. The resin adhesive may less preferably be a thermoplastic resin which is initially in a hardened state, is softened by heating so as to contact the surfaces of the articles 22 and 24, and then is hardened again by cooling to room temperature. (The term "curing" as used herein encompasses this processing of a thermoplastic adhesive as well as the processing of the preferred thermosetting adhesive, although there is no cross linking of the type found in thermosetting adhesives.)

FIG. 3 illustrates a prior art approach for bonding articles 50 and 52. A mixture of a resin adhesive 54 and small particles of a filler 56, termed a "filled adhesive" 58, is prepared and placed between the two articles 50 and 52. In the relatively low volume fraction shown in FIG. 3, the filler particles 56 do not form a continuous or substantially continuous conductive path between the two articles 50 and 52. Heat and or electricity must flow through the resin adhesive phase 54 in order to pass between the articles 50 and 52. Consequently, the thermal and electrical conductivities of the filled adhesive are greater than those of the adhesive alone, but not as great as those of the bonding element 26, wherein the porous metallic body forms a substantially continuous heat and electrical flow path between the articles. If the volume fraction of the particles in the filled adhesive is increased significantly so that there is a more nearly continuous path between the two articles, thereby increasing the conductivity of the conductive path, the amount of the adhesive, the cross-sectional area of the bonding path, and the adhesive contact area to the surfaces of the articles become so small that the bonding strength of the filled adhesive 58 is reduced to unacceptably low levels.

The bonding element 26 permits the relative fractions of the metallic body 28 and the resin adhesive 36 to be varied. The metallic body 28 desirably occupies from about 5 to about 80 percent by volume of the total volume of the bonding element, more preferably from about 40 to about 60 percent by volume, and most preferably about 50 percent by volume. However, even at the lower limit there is still a continuous conductive path between the articles 22 and 24, and even at the higher limit there is still reasonably good bonding of the resin adhesive 36 to the articles 22 and 24.

FIG. 1 illustrated two articles 22 and 24 generally. FIG. 4 depicts the preferred application of the inventors for the present invention. A dewar 70 includes a dewar body 72 whose interior is evacuated during service. The dewar body 72 has walls 74 with a window 76 in one of the walls 74. An electronic component 78, typically including a sensor 80, faces the window 76. The electronic component is connected to exterior instrumentation (not shown) by wires and a feedthrough 81 extending through the wall 74. The material of the window 76 is selected to transmit radiation of the wavelength sensed by the sensor 80, and such windows are well known in the art for various wavelengths of interest.

The electronic component 78 and its sensor 80 operate most efficiently at reduced temperatures, with the majority of applications at about 77 K, the boiling point of liquid nitrogen. To cool the electronic component 78 to that temperature, it is bonded onto a first end or side of a support 82 in the form of a cold finger, within the vacuum space of the dewar 70. The bonding is accomplished using the bonding element 26 discussed previously. The other end or side of the support 82, which is outside the vacuum space of the dewar 70, is contacted to a cold sink, indicated schematically by a heat sink arrow 84. The cold sink may be cooled by a cold gas and/or a liquefied gas such as liquid nitrogen, or a mechanical cooler.

In a typical service application, the entire dewar 70 and the electronic component 78 are initially at room temperature. At such time as the electronic component 78 and the sensor 80 are to be used, the cooling of the heat sink 84 is initiated. The support 82 begins to cool at the heat sink, and heat flows from the electronic component 78 and sensor 80 through the bonding element 26 into the other end of the support 82 and thence into the heat sink. The greater the thermal conductivity of bonding element 26, the faster is the cooling accomplished.

Figure 5:
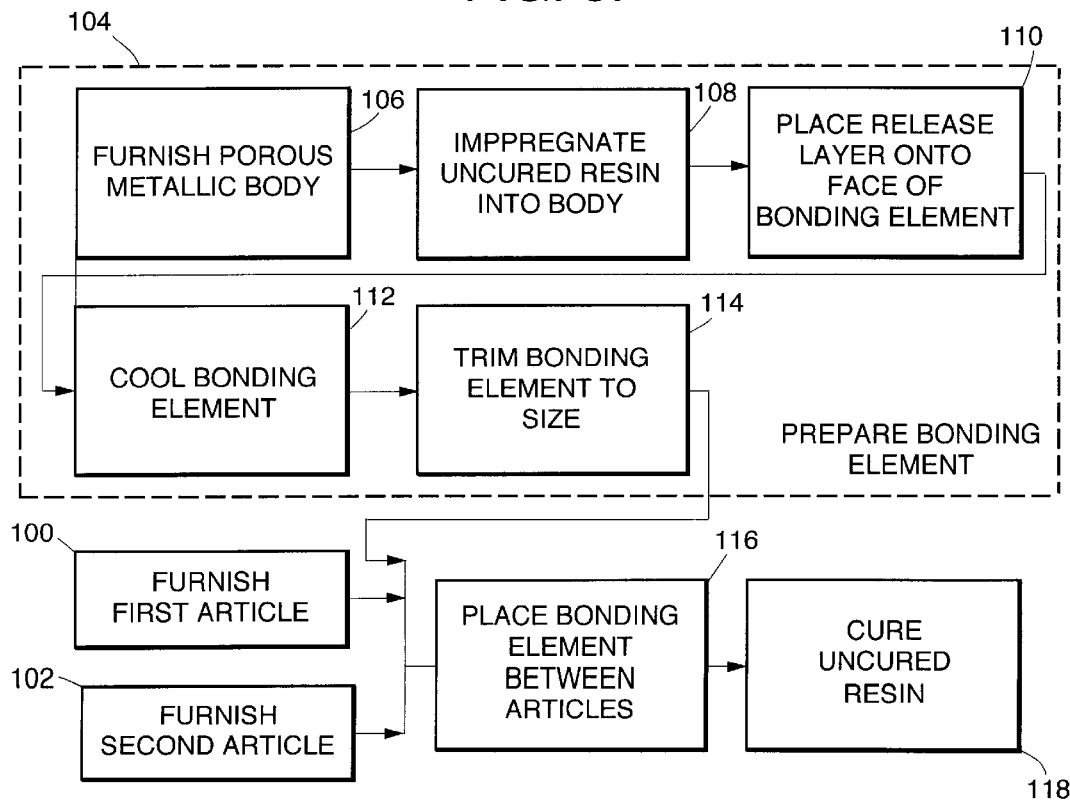
FIG. 5 is a block flow diagram of a preferred method according to the invention.

FIG. 5 depicts the preparation of the bonding element and its use in bonding two articles together. A first article is furnished, numeral 100, and a second article is furnished, numeral 102. The bonding element is prepared, numeral 104. The bonding element may be prepared at the time the bonding is to be accomplished, or at an earlier time as is preferred and as will be illustrated.

To prepare the bonding element, the porous metallic body is furnished, numeral 106. The uncured resin, preferably in an uncured form having a viscosity of about that of syrup, is impregnated into the porous metallic body at slightly elevated temperature and thereafter cooled to room temperature, numeral 108. Optionally, a layer of release paper is placed onto one or both faces of the impregnated porous metallic body, numeral 110. The bonding element is cooled, numeral 112, to a temperature at which the viscosity of the uncured resin is sufficiently high that it will not freely flow, and at which the uncured resin will not cure substantially. The bonding element may be stored for extended periods of time at this temperature, prior to its use in bonding elements together. For most resins, a freezer temperature of about −40° C. is sufficiently low for extended storage. The bonding element may, if desired, be made in oversize sheets and then cut and trimmed to the sizes required for each bond that is to be made, numeral 114, while it is in the cooled state. If the bonding element is to be used immediately rather than stored, any or all of steps 110, 112, and 114 may be omitted.

To use the bonding element to bond the articles together, the bonding element is placed between the surfaces of the articles that are to be bonded, numeral 116. The articles are preferably, but not necessarily, pressed together as a part of this step, in order to achieve good contact between the metallic body and the resin adhesive of the bonding element to the faces of the articles. The resin is thereafter cured, numeral 118, according to the procedures recommended for the resin. Curing may be accomplished for some resins by a period of exposure at room temperature. In other cases, heating is required in order to complete the curing. In the latter case, all or part of the articles being bonded may also be heated with the resin, but care is taken during such heating not to damage the electronic component 78.

For the approach of the invention as illustrated in FIG. 1, with the preferred 50 volume percent of copper screen, it is estimated that the thermal conductivity of the bonding element is about 0.5–2 watts/cm/K. For comparison, the thermal conductivity of a typical commercial silver-filled epoxy is about 0.013 watts/cm/K.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A structure comprising:
   a first article comprising a cold finger;
   a second article; and
   a bonding element disposed between and bonding together the first article and the second article, the bonding element comprising
      a porous metallic body, the porous metallic body contacting the first article and the second article and forming a substantially continuous path between the first article and the second article, and
      a mass of resin adhesive impregnated into the metallic body the mass of adhesive contacting and bonding to the first article and to the second article.

2. The structure of claim 1, wherein the porous metallic body is selected from the group consisting of a screen, a mesh, a felt, and a foam.

3. The structure of claim 1, wherein the metal is selected from the group consisting of copper, silver, aluminum, and steel, and their alloys.

4. The structure of claim 1, wherein the adhesive is an epoxy.

5. The structure of claim 1, wherein the porous metallic body occupies from about 5 to about 80 percent by volume of the bonding element.

6. A structure comprising:
   a first article;
   a second article comprising an electronic component; and
   a bonding element disposed between and bonding together the first article and the second article, the bonding element comprising
      a porous metallic body the porous metallic body contacting the first article and the second article and forming a substantially continuous path between the first article and the second article, and
      a mass of resin adhesive impregnated into the metallic body, the mass of adhesive contacting and bonding to the first article and to the second article.

7. The structure of claim 6, wherein the porous metallic body is selected from the group consisting of a screen, a mesh, a felt, and a foam.

8. The structure of claim 6, wherein the metal is selected from the group consisting of copper, silver, aluminum, and steel, and their alloys.

9. The structure of claim 6, wherein the adhesive is an epoxy.

10. The structure of claim 6, wherein the porous metallic body occupies from about 5 to about 80 percent by volume of the bonding element.

11. A structure, comprising:
    a cold finger;
    an electronic component; and
    a bonding element disposed between and bonding together the cold finger and the electronic component, the bonding element comprising
       a porous metallic body, the porous metallic body contacting the first article and the second article and forming a substantially continuous path between the first article and the second article, and
       a mass of resin adhesive impregnated into the metallic body, the mass of adhesive contacting and bonding to the first article and to the second article.

12. The structure of claim 11, wherein the porous metallic body is selected from the group consisting of a screen, a mesh, a felt, and a foam.

13. The structure of claim 11, wherein the metal is selected from the group consisting of copper, silver, aluminum, and steel, and their alloys.

14. The structure of claim 11, wherein the adhesive is an epoxy.

15. The structure of claim 11, wherein the porous metallic body occupies from about 5 to about 80 percent by volume of the bonding element.

* * * * *